(12) United States Patent
Al-Sadah (10) Patent No.: US 8,287,710 B2
(45) Date of Patent: Oct. 16, 2012

(54) SYSTEM FOR ELECTROSTATIC DESALINATION

(75) Inventor: Jihad Hassan Al-Sadah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 113 days.

(21) Appl. No.: 12/858,264

(22) Filed: Aug. 17, 2010

(65) Prior Publication Data
US 2011/0139623 A1    Jun. 16, 2011

(51) Int. Cl.
*C02F 1/48* (2006.01)

(52) U.S. Cl. .......... 204/571; 204/660; 204/554; 442/22; 442/186; 442/186.03; 442/186.04; 210/748.01

(58) Field of Classification Search .......... 210/748.01, 210/243, 650, 150; 204/164, 571, 660, 554, 204/155, 156, 157.15, 157.44, 194, 280, 204/288, 289, 520, 522; 422/186.1
See application file for complete search history.

(56) References Cited

U.S. PATENT DOCUMENTS

| | | | |
|---|---|---|---|
| 2,826,262 A * | 3/1958 | Byerly | 96/71 |
| 4,229,190 A * | 10/1980 | Andoniev et al. | 96/32 |
| 5,423,965 A | 6/1995 | Kunz | |
| 6,274,018 B1 | 8/2001 | Hidaka | |
| 6,274,019 B1 | 8/2001 | Kuwata | |
| 6,462,935 B1 | 10/2002 | Shiue et al. | |
| 2008/0030920 A1 * | 2/2008 | Krichtafovitch et al. | 361/233 |
| 2009/0255815 A1 | 10/2009 | Shiue et al. | |
| 2011/0056375 A1 * | 3/2011 | Tsai et al. | 96/45 |

FOREIGN PATENT DOCUMENTS

| | | |
|---|---|---|
| CN | 201245619 Y | 5/2009 |
| CN | 101462786 A | 6/2009 |
| GB | 1271829 A | 4/1972 |
| JP | 60081289 A | 5/1985 |
| JP | 2009045608 A | 3/2009 |
| WO | WO9500443 A1 | 1/1995 |
| WO | WO 2008058148 A2 * | 5/2008 |
| WO | WO2009155683 A1 | 12/2009 |

OTHER PUBLICATIONS

Barthakur, N.N., "Electrostatically Enhanced Evaporation Rates of Saline Water", Desalination, 74 (1989) 339-353.
Didkovsky, A.B. and Bologa, M.K., "Vapour Film Condensation Heat Transfer and Hydrodynamics Under the Influence of an Electric Field", Int. J. Heat Mass Transfer, vol. 24, No. 5 (1981) 811-819.
Montefinale, A.C. and Papee, H.M., "A simple experiment of condensation of water vapor by corona", Journal of colloid and interface science, vol. 22, No. 3 (1966) 296-297.

* cited by examiner

*Primary Examiner* — Joseph Drodge
*Assistant Examiner* — Cameron J Allen
(74) *Attorney, Agent, or Firm* — Richard C. Litman (57) ABSTRACT

The system for electrostatic desalination provides evaporative desalination of salt water utilizing ionized gas formed through corona discharge. The system includes a plurality of stacked water collection plates, each water collection plate having an upper surface and a lower surface. A thin film of salt water is formed on the upper surfaces thereof. A plurality of cathodes are provided, each cathode extending between a pair of adjacent ones of the plurality of stacked water collection plates. A plurality of anodes are attached to a corresponding one of the lower surfaces of the plurality of stacked water collection plates. Each anode and cathode is in communication with an external voltage source to generate an electrostatic field between the cathodes and the anodes. Thus, corona-induced ionized gas is produced between each of the stacked water collection plates in order to enhance condensation of pure evaporated water.

13 Claims, 6 Drawing Sheets

SYSTEM FOR ELECTROSTATIC DESALINATION

BACKGROUND OF THE INVENTION

1. Field of the Invention

The present invention relates to desalination systems, and particularly to a system for electrostatic desalination that uses ionized gas formed through corona discharge.

2. Description of the Related Art

Figure 6:
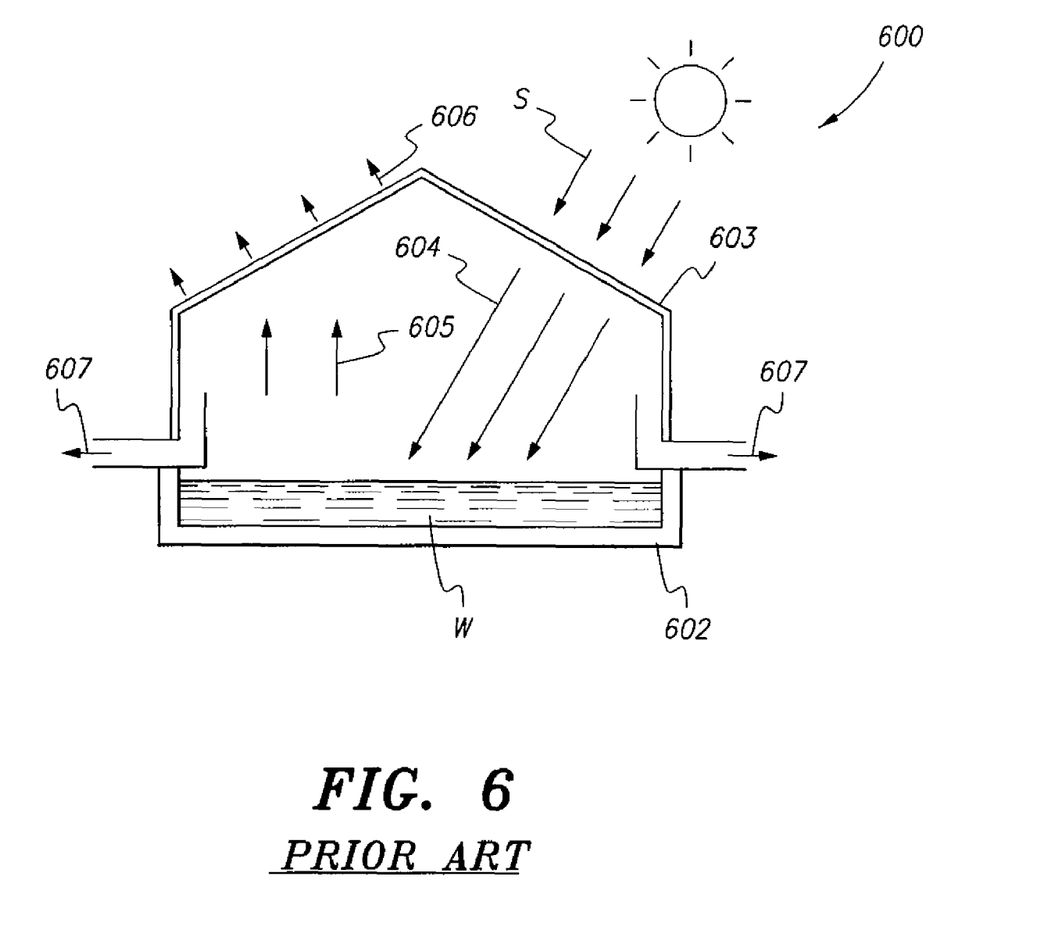
FIG. 6 diagrammatically shows a typical desalination system according to the prior art.

Recently, great interest has been focused on the technique of desalinating seawater through evaporation. FIG. 6 is a schematic view of a conventional desalination apparatus 600 utilizing solar energy, which is commonly known as a "basin type solar heat distiller". The desalination apparatus 600 has a basin 602 for holding raw water W (e.g., seawater) and an air shield 603 that covers the basin 602 and is permeable to sunlight S. The outer surface of the air shield 603 is used as a radiating part 606. In the desalination apparatus 600 of FIG. 6, the raw water W in the basin 602 is heated with sunlight S to generate water vapor 605. The water vapor 605 is cooled and condensed on the inner surface of the air shield 603, and thus distilled water 607 is obtained.

Although the system of FIG. 6 does not require the use of an external energy source (other than the solar energy), the evaporation rate is quite low, and depends upon the intensity of the sunlight. Thus, the system cannot produce pure water during the night or when it is cloudy, and the production rate is highly variable throughout the day and dependent upon the optical conditions and properties of air shield 603. Additionally, the condensation is inhibited by the fact that the shield is disadvantageously hot. It should be noted that the heat is utilized only in a single pass without recirculation and that the surface area available for evaporation is quite limited (i.e., limited by the surface of the basin).

Thus, a system for electrostatic desalination solving the aforementioned problems is desired.

SUMMARY OF THE INVENTION

The system for electrostatic desalination provides evaporative desalination of brine or salt water using ionized gas formed through corona discharge. The system for electrostatic desalination includes a plurality of stacked water collection plates. Each water collection plate has an upper surface and a lower surface. A thin film of salt water is formed on the upper surface of each water collection plate.

A plurality of cathodes are provided, each cathode extending between a pair of adjacent ones of the plurality of stacked water collection plates. The cathodes may be in the form of individual wires or leads extending between adjacent water collection plates, one end of each wire terminating therebetween and the other end being connected to the positive terminal of an external voltage source.

A plurality of anodes are provided, each anode being secured to a respective one of the lower surfaces of the plurality of stacked water collection plates. Each anode is in communication with the negative terminal of the external voltage source to generate an electrostatic field between the cathodes and the corresponding anodes, thus producing a corona discharge of ionized gas between each of the stacked water collection plates in order to ionize molecules of water in the water vapor and enhance their drifting toward the anode and, ultimately, the condensation thereof.

In use, the external voltage is selectively applied across the plurality of cathodes and the plurality of anodes in order to generate corona-ionized gas between pairs of adjacent ones of the plurality of stacked water collection plates. Due to natural evaporation, water vapor is formed between each plate. The molecules of water in the water vapor are ionized and the applied voltage enhances the drift thereof toward the corresponding anode, thus enhancing the production of condensed water vapor the thin film of salt water formed on each upper surface. The pure water vapor condenses into pure liquid water on uncovered portions of the lower surfaces of the plurality of stacked water collection plates. Preferably, the water collection plates are substantially parallel, and are also inclined with respect to the horizontal, allowing the collected condensed water to drip or trickle, under the force of gravity, from the plates for collection.

The plurality of plates may be provided as substantially annular discs mounted about a central shaft. The central shaft may be cooled, thus cooling the lower surfaces of each annular disc to enhance the rate of condensation thereon. Alternatively, the plurality of water collection plates may be replaced by a helical water collection structure, having a plurality of substantially annular levels defined by the helical structure acting as the plurality of water collection plates. Preferably, a plurality of water collection grooves are formed in the upper surface of the helical structure, or in the upper surfaces of the separate water collection plates, for forming and slowing the flow of the thin film of salt water.

As a further alternative, a secondary condenser plate may be positioned adjacent to the plurality of stacked water collection plates and arranged substantially vertically. A secondary cathode is positioned adjacent a condensing surface of the secondary condenser plate, and a secondary anode is mounted on the condensing surface of the secondary condenser plate. Water may condense on both the lower surfaces of the water collection plates as well as on the secondary condenser plate. However, it should be understood that the secondary plates reduce heat recirculation, thus making them more effective in terms of cooling function (i.e., based on the evaporative cooling effect).

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
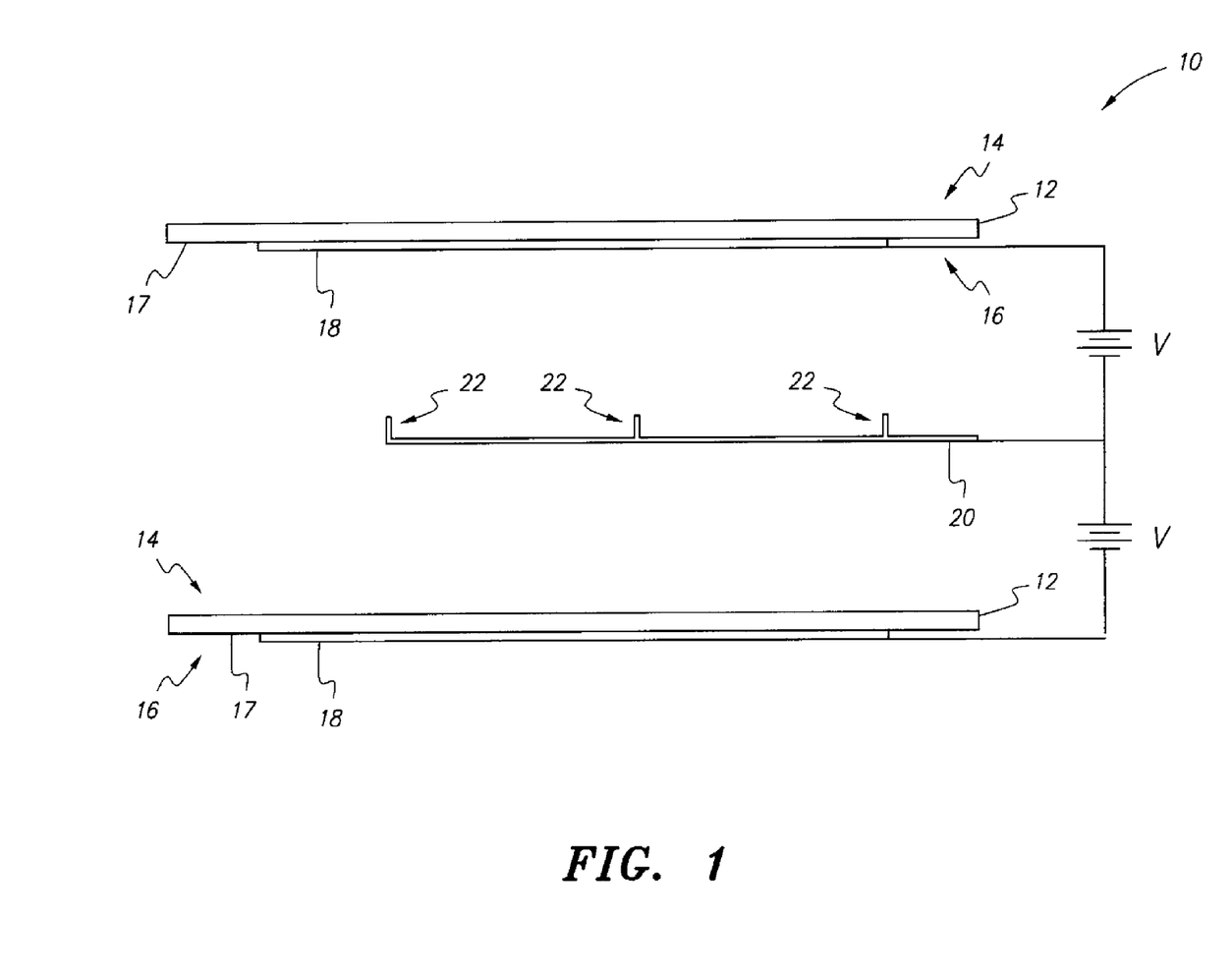
FIG. 1 schematically illustrates a system for electrostatic desalination according to the present invention.

The system for electrostatic desalination 10 provides evaporative desalination of brine or salt water utilizing ionized gas formed through corona discharge. The system for electrostatic desalination 10 includes a plurality of stacked water collection plates 12, each water collection plate 12 having an upper surface 14 and a lower surface 16. A thin film of salt water is formed on the upper surface 14 of each water collection plate 12. In FIG. 1, only two such plates 12 are illustrated. It should be understood that any suitable number of plates 12 may be utilized and that the pair of water collection plates 12 in FIG. 1 are shown for simplified illustrative and descriptive purposes only.

A plurality of cathodes 20 are provided, each cathode 20 extending between a pair of adjacent ones of the plurality of stacked water collection plates 12. As noted above, FIG. 1 only illustrates one pair of plates 12 for purposes of simplified illustration. Thus, only a single cathode 20 is shown extending therebetween. It should be understood that for each pair of adjacent plates 12, one cathode 20 extends therebetween.

The cathodes 20 may be in the form of individual wires or leads extending between adjacent water collection plates 12, as shown, with one end of each wire 20 terminating therebetween and with the other end being connected to the positive terminal of an external voltage source V. As shown in FIG. 1, each cathode 20 preferably has a plurality of needles or substantially sharp projections extending substantially orthogonally towards a respective anode 18. As will be described in greater detail below, these needles or projections form corona tips for producing electrons, which ionize molecules of water vapor during the corona discharge, thus enhancing electrostatic transport of the water molecules. A carrier gas, such as helium, for example, may also be injected between plates, but does not contribute to the electrostatic transport of the ionized water molecules.

The plurality of anodes 18 are respectively secured to the lower surfaces 16 of the plurality of stacked water collection plates 12, as shown. The plurality of anodes 18 may be secured thereto in any suitable manner, such as adhesively, by welding, or the like. Each anode 18 is in communication with the negative terminal of the external voltage source V to generate an electrostatic field between the cathodes 20 and the respective anodes 18. The needles 22 of each cathode 20 are provided to enhance corona discharge. Thus, the corona discharge produces ionized gas between each of the stacked water collection plates 12 in the water vapor formed between the plates (i.e., water vapor produced through natural evaporation from the thin film of salt water). The corona discharge produces ionized molecules of water in the water vapor, thus enhancing the drift toward the anode and increasing the rate of condensation thereon. This may be viewed as a drying of the gap between plates, adjacent the thin film of salt water, thus further enhancing evaporation thereof.

Electrostatically enhanced evaporation of salt water is a well-known effect and is described in Barthakur, N. N., "Electrostatically Enhanced Evaporation Rates of Saline Water", *Desalination,* 74 (1989) 339-353; Didkovsky, A. B. and Bologa, M. K., "Vapour Film Condensation Heat Transfer and Hydrodynamics Under the Influence of an Electric Field", *Int. J. Heat Mass Transfer,* Vol. 24, No. 5 (1981) 811-819; and Montefinale, A. C. and Papee, H. M., "A simple experiment of condensation of water vapor by corona", *Journal of colloid and interface science, Vol.* 22, No. 3 (1966) 296-297, each of which is hereby incorporated by reference in its entirety.

Figure 3:
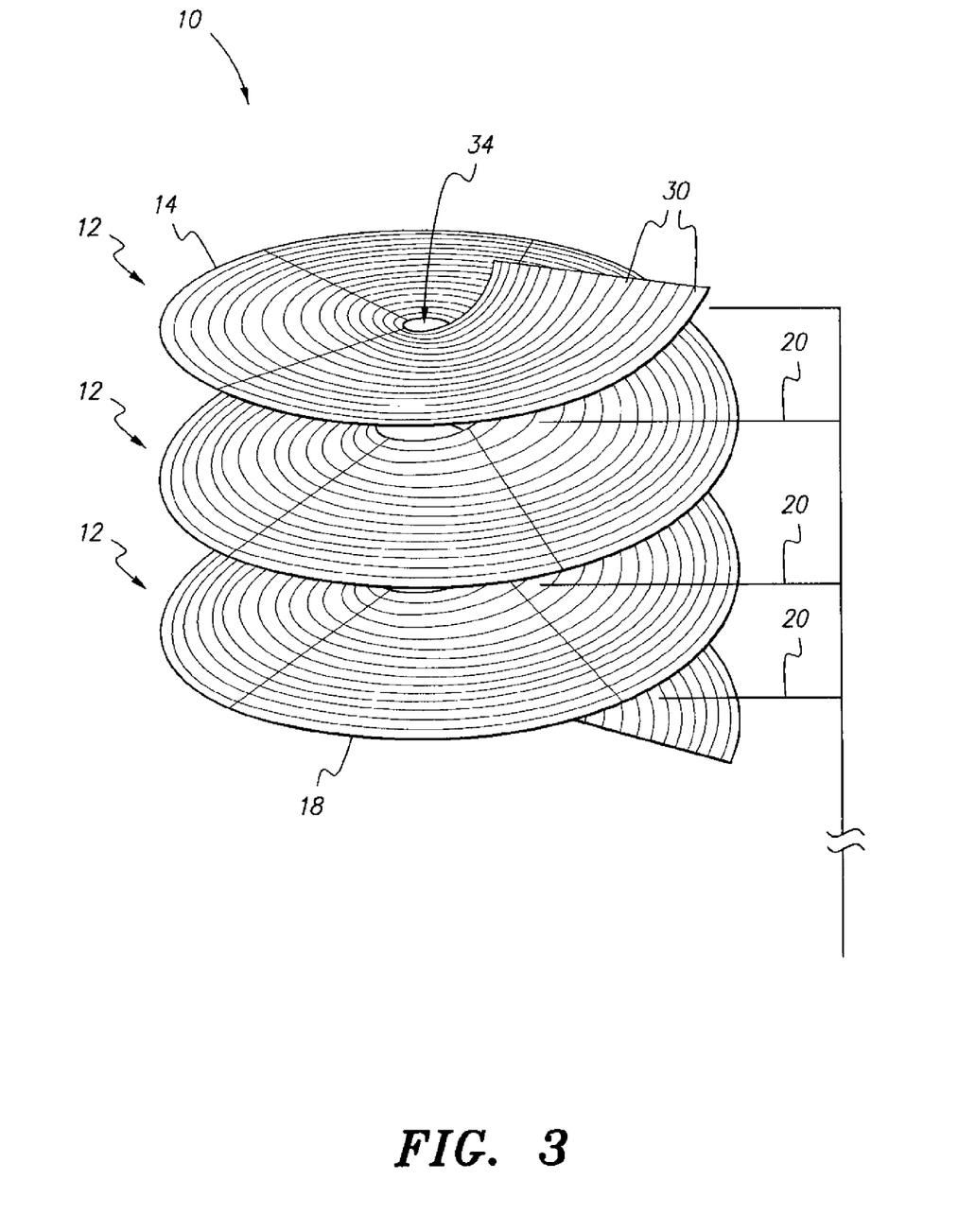
FIG. 3 is a perspective view of another alternative embodiment of a system for electrostatic desalination.

In use, the external voltage V is selectively applied across the plurality of cathodes 20 and the plurality of anodes 18 in order to generate corona-ionized gas between pairs of adjacent ones of the plurality of stacked water collection plates 12. Due to natural evaporation, water vapor is formed between each plate 12. The molecules of water in the water vapor are ionized and the applied voltage enhances the drift thereof toward the corresponding anode 18, thus enhancing the production of condensed water vapor the thin film of salt water formed on each upper surface 14. Preferably, condensation occurs along the entire lower surface and not only the uncovered portion illustrated in the example of FIG. 1. Preferably, the lower surface is metalized and may be formed with no uncovered portions (i.e., with the anode 18 covering the entire lower surface). It should be understood that FIG. 1 diagrammatically illustrates an example only, and that any desired coverage of lower surface 16 of plate 12 by anode 18 may be used. The pure water vapor condenses into pure liquid water on uncovered portions 17 of the lower surfaces 16 of the plurality of stacked water collection plates 12 as well as on anode 18; i.e., along the entire lower surface of the plate. Preferably, the water collection plates 12 are substantially parallel, and are also inclined with respect to the horizontal, allowing the collected condensed water to drip or trickle, under the force of gravity, from the plates 12 for collection. The configuration of FIG. 3 (wherein the plates are formed to define a helical structure), which will be described in detail below, allows for such an inclined collection of the pure condensed water and also allows for two simultaneous flows of water; i.e., the thin film of salt water formed on the upper surface of the helical plates and condensed pure water trickling on the lower surface thereof at the same time.

Figure 4:
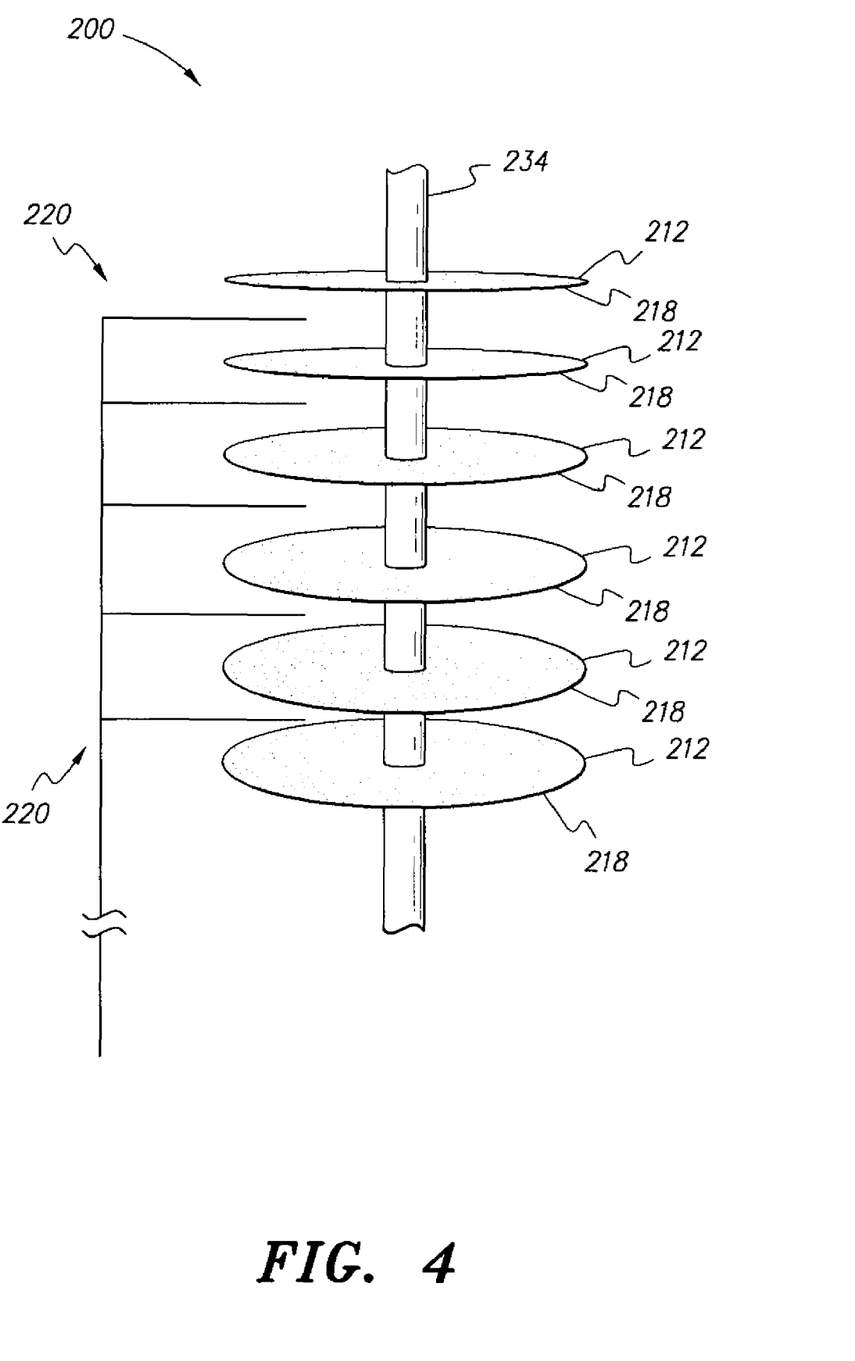
FIG. 4 is a perspective view of still another alternative embodiment of a system for electrostatic desalination.

In the embodiment of FIG. 4, the system 200 includes a plurality of plates 212 that are formed as substantially annular discs, with each disc being mounted about a central shaft 234. The system 200 works in a manner similar to that described above with regard to FIG. 1, with cathodes 220 extending between the plates 212, each of which has a corresponding anode 218 mounted to a lower surface thereof. It should be noted that in this configuration, system 200 acts as a cooler or refrigerator, taking advantage of the evaporative cooling effect. The anodes 218 preferably do not accumulate condensed water; system 200 is designed purely for evaporative cooling, thus allowing the individual plates to be used as cooling or refrigerating discs. An external source of heat may be applied to central shaft 234 to enhance evaporation. It should be understood that the cathode needles 220 are shown for exemplary purposes only. In this embodiment, cathode 220 may be removed.

As noted above, FIG. 3 illustrates the plurality of distinct water collection plates 12 replaced by a continuously helical water collection structure, having a plurality of substantially annular levels defined by the helical structure, which act and serve as the plurality of water collection plates 12, as described with regard to FIG. 1. Preferably, a plurality of water collection grooves 30 are formed in the upper surface of helical structure (or in the upper surfaces of the separate water collection plates of the embodiments of FIG. 1 and FIG. 4), for forming and slowing the flow of the thin film of salt water. A cooled central shaft similar to the shaft 234 of FIG. 4 may be inserted in an axial opening 34 of the helical structure, and/or the collection of water may occur within the central opening of the helical structure. As an alternative to the grooves, the upper surfaces may be coated with sand or other particulate matter to form channels therein, thus enhancing overall surface area for increasing rate of evaporation.

Figure 2:
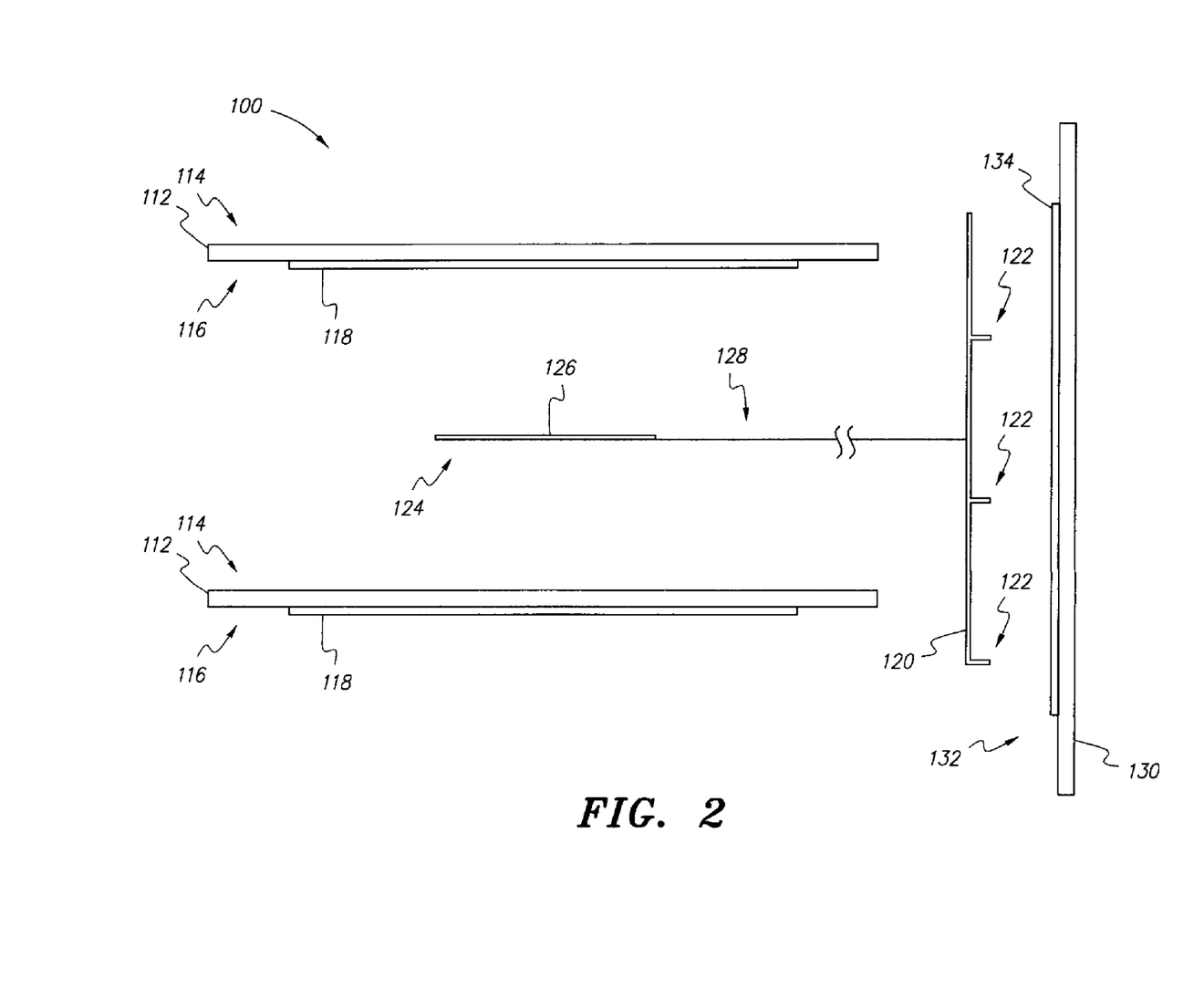
FIG. 2 schematically illustrates an alternative embodiment of a system for electrostatic desalination according to the present invention.

As a further alternative, in the system 100 shown in FIG. 2, a secondary condenser plate 130 is positioned adjacent to the plurality of stacked water collection plates 112, the secondary condenser plate 130 being arranged substantially vertically. The water collection plates 112 are substantially similar to the water collection plates 12 of FIG. 1, including corresponding upper and lower surfaces 114, 116, an anode 118 mounted to the lower surface 116 of each plate 112, and a cathode 124 extending between adjacent plates 112. As shown, the cathode 124 may be in the form of a wire or lead 128, which may be partially covered by an insulating layer 126, if desired. Needles similar to needles 22 may be formed on the cathode 124, or the cathode 124 may be left as a plain wire or lead. An enhanced corona effect may be induced by a secondary cathode 120, which is positioned adjacent a condensing surface 132 of the secondary condenser plate 130. Although shown as being formed together in a single unit, it should be understood that the secondary cathode 120 may also be a separate circuit. FIG. 2 is shown diagrammatically and for exemplary purposes only.

The secondary cathode 120 is not covered with insulating material, and preferably has corona-inducing needles 122 formed thereon extending towards the secondary anode 134 in order to provide a far greater corona effect than that of the cathode 124 and anodes 118 by themselves. The secondary anode 134 is mounted on the condensing surface 132 of the secondary condenser plate 130. Water may condense on the lower surfaces 116 of the water collection plates 112, as well as on the secondary condenser plate 130. However, the secondary plates reduce heat recirculation, thus making them more effective for cooling (i.e., based on the evaporative cooling effect). The vertical arrangement of condenser plate 130 further increases production and capture of the purified condensed water.

Figure 5:
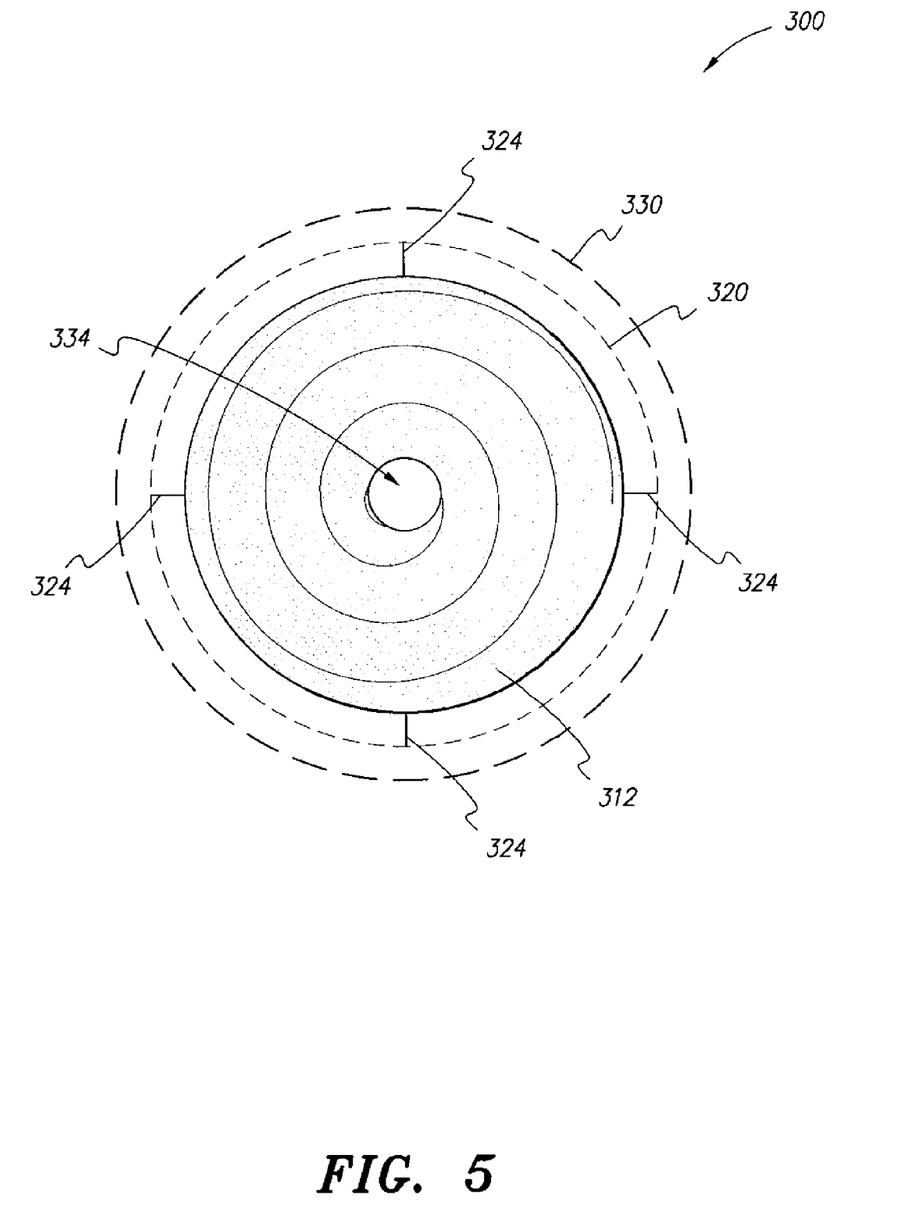
FIG. 5 is a top view of still another alternative embodiment of a system for electrostatic desalination.

The system 300 of FIG. 5 illustrates a further alternative arrangement. A secondary condenser plate 330 is provided, similar to that of FIG. 2, but formed as a cylindrical shell about a helical plate structure 312, similar to that described in FIG. 3. A secondary cathode 320 annularly encircles the helical plate structure 312, and is positioned adjacent the secondary condenser plate 330, with the primary cathode wires 324 projecting radially inward and arranged to extend between adjacent levels of the helical plate structure, as described above with regard to the embodiments of FIGS. 1, 3 and 4. The helical structure may be replaced by the stacked annular plates of FIG. 4, including either a similar cooled shaft, or allowing for collection of the water within the central region 334.

It should be understood that in each of the above embodiments, the individual water collection plates (or the levels of the continuous helical structure) are spaced relatively close together in order to minimize mass transport of the water vapor. Additionally, this close spacing lowers the voltage necessary to induce the required electrostatic field, although it should be understood that there is sufficient spacing between each anode and its corresponding cathode to minimize the possibility of arcing therebetween, particularly in light of the water vapor formed in the gap between plates.

Additionally, the above embodiments may be contained within sealed vessels, thus preventing contamination from the external environment. In such an arrangement, prior to use, air may be removed from the sealed vessel through attachment to a suitable vacuum pump, and the vessel may instead by filled with an inert gas, such as helium, thus inhibiting the production of ozone and nitric compounds through corona discharge in air.

It is to be understood that the present invention is not limited to the embodiments described above, but encompasses any and all embodiments within the scope of the following claims.

I claim:

1. A system for electrostatic desalination, comprising:
a plurality of stacked water collection plates, each of the water collection plates having an upper surface and a lower surface, the upper surface being adapted for supporting a thin film of salt water formed thereon;
a plurality of cathodes, each of the cathodes extending between a pair of adjacent collection plates in the plurality of stacked water collection plates;
a plurality of anodes, each of the anodes being attached to a respective one of the lower surfaces of the plurality of stacked water collection plates; and
a plurality of conductive needles mounted on each said cathode, each said conductive needles extending substantially orthogonally towards a respective one of said anodes, wherein each said needle forms a corona tip for producing electrons, the electrons ionizing molecules of pure water vapor during corona discharge, the pure water vapor being formed from natural evaporation of the thin film of salt water, whereby the ionization of the molecules of the pure water vapor enhances electrostatic transport of the molecules of the pure water vapor;
whereby, an external voltage applied across the plurality of cathodes and the plurality of anodes generates the corona discharge to ionize the pure water vapor evaporated from the thin film of salt water formed on the upper surface of the collection plates, electrostatic transport thereof being effected toward the lower surfaces of the plurality of stacked water collection plates and being enhanced by the ionization thereof, the pure water vapor condensing into pure liquid water thereon.

2. The system for electrostatic desalination as recited in claim 1, wherein said water collection plates are substantially parallel to one another.

3. The system for electrostatic desalination as recited in claim 2, wherein said water collection plates are each inclined with respect to the horizontal.

4. The system for electrostatic desalination as recited in claim 3, wherein said plurality of stacked water collection plates form a helix.

5. The system for electrostatic desalination as recited in claim 4, wherein the upper surface of each said collection plate has a plurality of water collection grooves formed therein.

6. The system for electrostatic desalination as recited in claim 4, wherein the upper surface of each said collection plate is coated with particulate matter to form channels therein.

7. The system for electrostatic desalination as recited in claim 3, further comprising a secondary condenser plate positioned adjacent to said plurality of stacked water collection plates.

8. The system for electrostatic desalination as recited in claim 7, further comprising:
a secondary cathode positioned adjacent the secondary condenser plate; and
a secondary anode attached to the secondary condenser plate.

9. The system for electrostatic desalination as recited in claim 8, wherein the secondary condenser plate is positioned substantially vertically.

10. The system for electrostatic desalination as recited in claim 3, wherein each said water collection plate is substantially annular.

11. The system for electrostatic desalination as recited in claim 10, further comprising a central shaft, said plurality of water collection plates being mounted about the central shaft.

12. The system for electrostatic desalination as recited in claim 11, further comprising means for cooling the central shaft.

13. A system for electrostatic desalination, comprising:
a plurality of stacked water collection plates, each of the water collection plates having an upper surface and a lower surface, the upper surface being adapted for supporting a thin film of salt water formed thereon, wherein said water collection plates are substantially parallel to one another and are each inclined with respect to the horizontal, said plurality of stacked water collection plates forming a helix, the upper surface of each said collection plate being coated with particulate matter to form channels therein;

a plurality of cathodes, each of the cathodes extending between a pair of adjacent collection plates in the plurality of stacked water collection plates;

a plurality of anodes, each of the anodes being attached to a respective one of the lower surfaces of the plurality of stacked water collection plates; and a plurality of conductive needles mounted on each said cathode, each said conductive needles extending substantially orthogonally towards a respective one of said anodes, wherein each said needle forms a corona tip for producing electrons, the electrons ionizing molecules of pure water vapor during corona discharge, the pure water vapor being formed from natural evaporation of the thin film of salt water, whereby the ionization of the molecules of the pure water vapor enhances electrostatic transport of the molecules of the pure water vapor;

whereby, an external voltage applied across the plurality of cathodes and the plurality of anodes generates the corona discharge to ionize the pure water vapor evaporated from the thin film of salt water formed on the upper surface of the collection plates, electrostatic transport thereof being effected toward the lower surfaces of the plurality of stacked water collection plates and being enhanced by the ionization thereof, the pure water vapor condensing into pure liquid water thereon.

* * * * *